United States Patent [19]

Best

[11] Patent Number: 5,063,468

[45] Date of Patent: Nov. 5, 1991

[54] COMPATIBLE MAGNETIC HEAD ASSEMBLY

[75] Inventor: Donald T. Best, Lafayette Hill, Pa.

[73] Assignee: North American Philips Corporation, New York, N.Y.

[21] Appl. No.: 520,791

[22] Filed: May 8, 1990

[51] Int. Cl.$^5$ .................. G11B 5/17; G11B 5/265
[52] U.S. Cl. ...................... 360/123; 360/121
[58] Field of Search .................. 360/121, 123

[56] References Cited

U.S. PATENT DOCUMENTS

| | | | |
|---|---|---|---|
| 4,323,941 | 4/1982 | Lazzari et al. | 360/123 |
| 4,385,334 | 5/1983 | Yanagida | 360/123 |
| 4,396,967 | 8/1983 | Argumedo et al. | 360/121 |
| 4,600,958 | 7/1986 | Hurst et al. | 360/123 |
| 4,685,005 | 8/1987 | Fields | 360/121 |
| 4,805,051 | 2/1989 | DeMarco et al. | 360/121 |

Primary Examiner—Robert S. Tupper
Attorney, Agent, or Firm—David R. Treacy

[57] ABSTRACT

The magnetic head assembly can read from and write to a plurality of tracks on a magnetic medium. The medium and assembly are relatively movable in a longitudinal direction. The assembly includes a plurality of pairs of reading poles. The assembly also includes a plurality of pairs of read loops, each adjacent and magnetically coupled to an associated pair of said reading poles. Also provided is a plurality of writing poles. Each pair of said writing poles is aligned with a different corresponding one of said writing poles. The assembly also includes a plurality of pairs of write loops, each pair of write loops being adjacent and magnetically coupled to an affiliated one of said writing poles. Each pair of write loops is selectively driveable with a pair of currents in either the same or opposite sense.

20 Claims, 4 Drawing Sheets

COMPATIBLE MAGNETIC HEAD ASSEMBLY

BACKGROUND OF THE INVENTION

The present invention relates to a magnetic head assembly and, in particular, to an assembly for reading and writing to a plurality of tracks on a magnetic medium.

The continuing need in the data processing and computer fields for larger memories creates an increasing demand on non-volatile mass storage devices such as magnetic tape used for backing up data. A mass storage unit offering higher capacity should also offer "backwards compatibility." For a magnetic tape, backwards compatibility implies the ability to at least read extant tapes recorded at the lower density with the new high capacity tape drive. Backwards compatibility is important because the number of extant tapes can be great. Thus, converting data on numerous extant tapes into higher density tapes compatible with a new drive would be prohibitively expensive. Also a user may continue to create lower density tapes by operating separate machines with the higher and lower density tape drives. The operator may wish to transfer data recently written by the lower density tape drive to the system having the improved performance. The latter is referred to as "backwards read compatibility."

Also desirable is "backwards write compatibility," the ability of the higher density tape drive to write in not only the higher density mode, but in the earlier low density mode. Therefore, the high density tape drive could be used to transfer data to a machine having a low density tape drive.

Both types of compatibility, especially backwards write compatibility, can be difficult to achieve with tapes that are simultaneously written with multiple parallel channels across the width of the tapes. Often the increased data density is achieved by increasing the number of channels on the tape. Consequently, there potentially will be a physical incompatibility between earlier tape and the improved, high density magnetic head.

In a conventional 18 track tape drive, the write heads write 0.54 mm wide tracks at a pitch of 0.63 mm. The read heads are aligned with the write heads and are 0.41 mm wide. The latter are made narrower to allow for manufacturing tolerances, imperfect tracking of tape, and differences between machines, to assure that the read heads will always be over good sections of track, even when the tapes are written on different drives.

A simple but problematic approach towards compatibility would be to provide twice the number of read and write elements, but operated in pairs. Such a design must deal with both electromagnetic and mechanical limitations. One of the mechanical limitations in fabricating a high density magnetic head is the conventional step of closely cutting narrow slots in ferrite material to define the border between adjacent channels. For example, practical cuts may be kept no less than 0.09 mm wide. Reducing the pitch and width of the cuts to increase data density can be technologically difficult and can raise fabrication costs unacceptably.

Electromagnetically, if an 18 track tape were loaded on a 36 track machine and the outputs of selected pairs of read heads were combined, tracks could be successfully read. Since output is proportional to head width, all other things being equal, the output would be smaller than with the 18 track head. The width of the conventional read element is 0.41 mm, while the combined width of a pair of elements from a 36 track head would be about 0.23 mm. However, with proper care, cable shielding and preamplifier design, the signal to noise ratio would be adequate to recover the data. Thus a pair of high density read elements could be connected together to read an older tape whose wider channels would each extend over a pair of read elements.

High density write elements could also be driven as a pair to simulate a relatively wide track. However, recording in this fashion will cover only part of the traditional channel width. The new pair of write elements will not record in the space between them, which would be the center of the simulated wide channel. Accordingly, the signal to noise ratio (hereinafter signal to interference ratio) would be severely degraded. This ratio could be as low as 11.02 dB, if a double density drive (18 to 36 tracks) wrote a pair of tracks at a combined width of 0.41 mm leaving a 0.09 mm interfering strip. Such interference would prevent reliable operation. Filtering this interference would be impossible since the interference would have the same spectrum as the desired signal. Thus, a user would be obliged to make certain the tapes were erased before recording if they could possibly contain full-width, 18 track data.

In the foregoing example, the intertrack gap was unchanged from what it was in the earlier machine. If, however, all dimensions could be reduced equally, the intertrack gap could also be cut in half, for example, to 0.045 mm. The track width simulated by the paired write heads would remain at 0.41 mm. With these assumptions the signal to interference ratio would be 18.18 dB, a significant improvement. Data integrity, however, would still not be sufficient. Moreover, practical manufacturing methods may not allow reducing the intertrack gap because it may require cutting an unacceptably narrow slot of 0.045 mm.

Accordingly, there is a need for an improved high density magnetic head that can provide backwards read and write compatibility with earlier machines having fewer channels on the magnetic media.

SUMMARY OF THE INVENTION

In accordance with the illustrative embodiments demonstrating features and advantages of the present invention, there is provided a magnetic head assembly for reading from and writing to a plurality of tracks on a magnetic medium. The medium and assembly are relatively moveable in a longitudinal direction. The magnetic head assembly includes a plurality of pairs of reading poles and a plurality of writing poles. Also included is a plurality of pairs of read loops, each adjacent and magnetically coupled to an associated pair of said reading poles. Each pair of reading poles is aligned with a different corresponding one of the writing poles. The magnetic head assembly also includes a plurality of pairs of write loops, each pair of write loops being adjacent and magnetically coupled to an affiliated one of the writing poles. Each pair of write loops is selectively driveable with a pair of currents in either the same or opposite sense.

A related method of the same invention can assemble a magnetic head. The method employs reading and writing poles and read and write loops for reading and writing to a plurality of tracks on a magnetic medium. The method includes the step of magnetically and physically coupling pairs of the read loops to an associated pair of the reading poles. Another step is magnetically and physically linking pairs of the write loops to an affiliated one of the writing poles. The method also includes the step of aligning the pairs of reading poles with a different corresponding one of the writing poles. The method also includes the step of making connections to the pairs of write loops to allow them to be selectively driven with a pair of currents in either the same or opposite sense.

By employing apparatus and assembly methods of the foregoing type, a head with increased track density can provide both backwards read and backwards write compatibility with lower track density machines. In particular, the apparatus provides a technique for increasing the tracks on standard machines from 18 to 36, while affording the desired backwards compatibility. The apparatus can achieve a signal to interference ratio that is high enough on an 18 track machine to prevent unacceptable error rates.

In an improved magnetic head assembly, the write pole has preferably about the same width and pitch as the older, less dense heads. The pole is, however, driven by a pair of loops or coils and therefore can independently provide different magnetic fluxes at adjacent locations in the same pole. Accordingly, when a tape is to be written in a less dense mode, the pair of write coils associated with a single write pole can be driven in sympathy. Thus the write pole acts very much like the older, less dense tape drive. When a higher density tape mode is selected, the individual coil pairs are driven independently so that a higher density tape is recorded. The region between adjacent pairs of tracks recorded by a unitary pole will be ambiguous, but also will be normally unread by the more densely spaced read poles.

BRIEF DESCRIPTION OF THE DRAWINGS

The above brief description as well as other objects, features and advantages of the present invention will be more fully appreciated by reference to the following description of presently preferred, but nonetheless illustrative embodiments in accordance with the present invention when taken in conjunction with the accompanying drawings wherein.

DETAILED DESCRIPTION OF THE PREFERRED EMBODIMENTS

Figure 1:
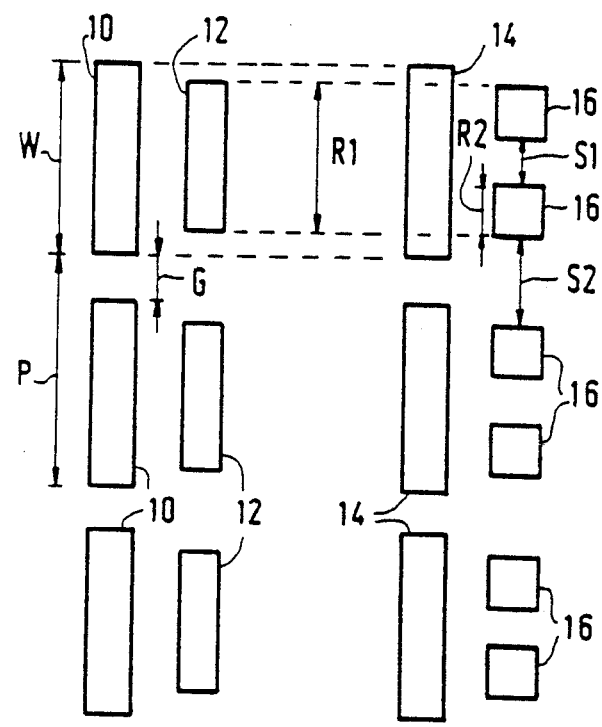
FIG. 1 is a schematic diagram comparing the arrangement of heads in a magnetic head assembly in accordance with the principles of the present invention.

FIG. 1 makes a side by side comparison of 18 and 36 track magnetic heads. A conventional 18 track head is shown having a plurality of writing poles 10 and reading poles 12. For a conventional 18 track head, the write heads are 0.54 mm wide and are laid at a pitch of 0.63 mm. The reading poles 12 have the same pitch, but are 0.41 mm wide. Improved writing pole 14 is shown having the same pitch as the less dense writing pole 10. Poles 10 and 14 are shown having the same transverse width W as well, although in some embodiments the widths may differ somewhat without departing from the spirit of the present invention.

The transverse ends of writing poles 14 are equidistantly spaced from improved reading poles 16. Poles 16 are shown grouped in pairs corresponding to each of the writing poles 14. Within each pair, the pole to pole spacing S1 is less than the spacing S2 between adjacent pairs. In a preferred embodiment for a 36 track head, the dimensions S1 and S2 were 0.18 mm and 0.22 mm, respectively. The pairs of reading poles 16 are designed to fit within the same width R1 as the older reading pole 12, although this alignment can be altered somewhat without departing from the spirit of the present invention.

Figure 2:
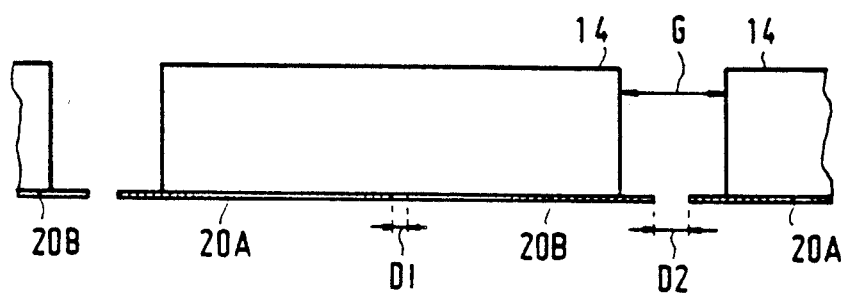
FIG. 2 is a detailed sectional view of the write heads of FIG. 1.

Referring to FIG. 2, previously illustrated ferrite writing poles 14 are shown in detail with an interpole spacing G, of 0.09 mm. Pairs of write loops 20A and 20B are attached to each of the poles 14. The interloop spacing D1 within each of the pairs of write loops is 0.015 to 0.035 mm, while the interloop spacing D2 from pair to pair is 0.035 mm.

If the spacing between each write loop is approximately 0.035 mm, the signal to interference ratio is about 20.6 dB. This figure is based strictly on the spacing ratio and is optimistic in that it does not account for the weaker magnetizing field at the ends of the coils, but pessimistic in that it ignores fringing. It is clear, however, that the spaces between coils, determined by precise photolitographic methods, can be reduced significantly. If the spacing between write loops is reduced to 0.015 mm, then the signal to interference ratio might may be as high as: $20 \log[(0.41-0.015)/0.015] = 28.41$ dB, a very comfortable figure.

To the extent that the structures are perfectly symmetrical, and equal (but possibly opposite) currents are applied to the loops, each of the written tracks will project towards the centerline between them but not over into the other track. To the extent that the balance is imperfect, the true dividing line might be somewhat above or below the mechanical centerline, but it would certainly not extend into the area covered by the other read head.

Figure 3:
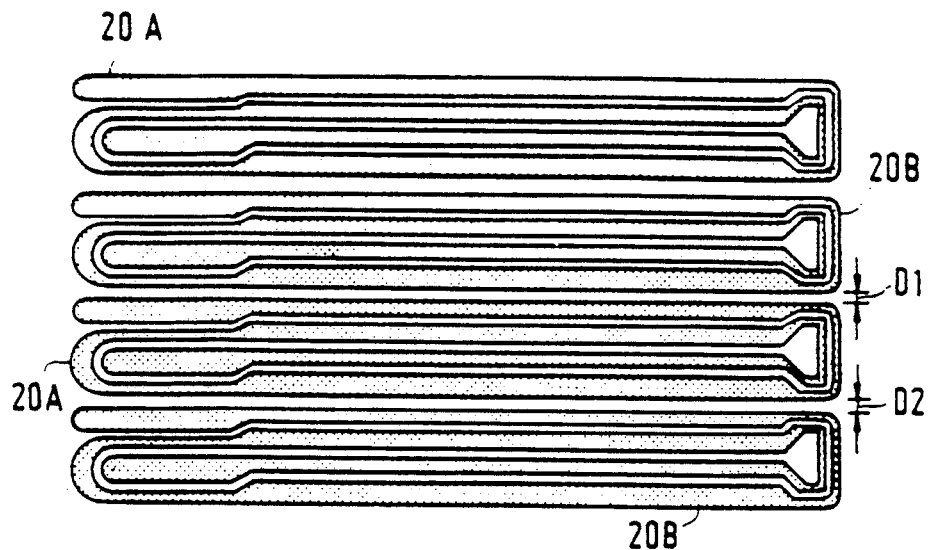
FIG. 3 is a plan view of the write loops of FIG. 2.

Referring to FIG. 3, loops 20A and 20B are shown herein as coplanar, multi-turn coils. The loops comprise two turns, although in other embodiments a different number of loops can be employed. Loops 20A and 20B can be thin film depositions of conductive material. As illustrated, each of the loops 20A and 20B are identical except that the spacing between them varies from dimension D1 to D2.

Figure 4:
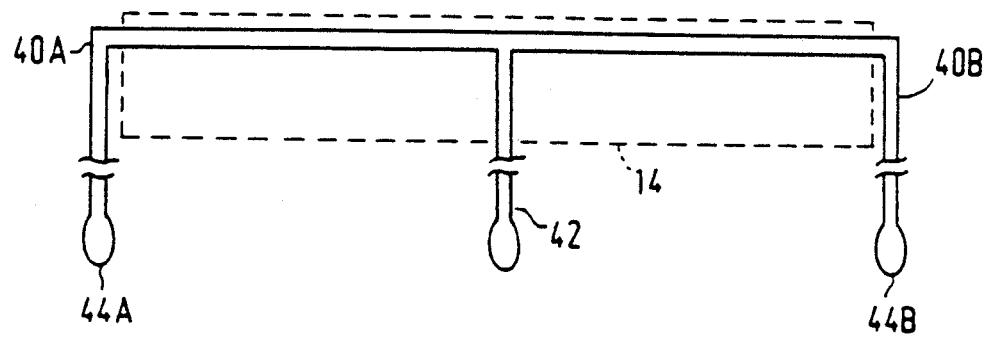
FIG. 4 is a plan view of a pair of write loops, which are an alternate to that of FIG. 3.

Referring to FIG. 4, a pair of loops 40A and 40B replace the previously illustrated write loops (loops 20A and 20B, respectively). The loops 40A and 40B are shown overlying previously illustrated write pole 14, shown in phantom. Loops 40A and 40B are joined together at centertap 42. The other terminals of loops 40A and 40B are shown herein as terminals 44A and 44B, respectively. The loops can again be thin film depositions of conductive material. Also, while the corners of loops 40A and 40B are shown rectangular, they may be curved in other embodiments. Furthermore, in some embodiments the junction between loops 40A and 40B can be indented so that the tracks recorded by the pairs of loops have a small dead zone between them.

It is also possible to build the loops with two turns or more, but then the magnetic field during writing would be weaker in the region between the two loops. Thus, complete overwriting of the tape between adjacent tracks would not occur when the head is operated as an 18 track head.

An additional benefit of this technique is that the resulting tracks are written wider than they would be otherwise solely for the purpose of achieving compatibility; hence the read heads can be made wider, resulting in larger readback signals.

Figure 5:
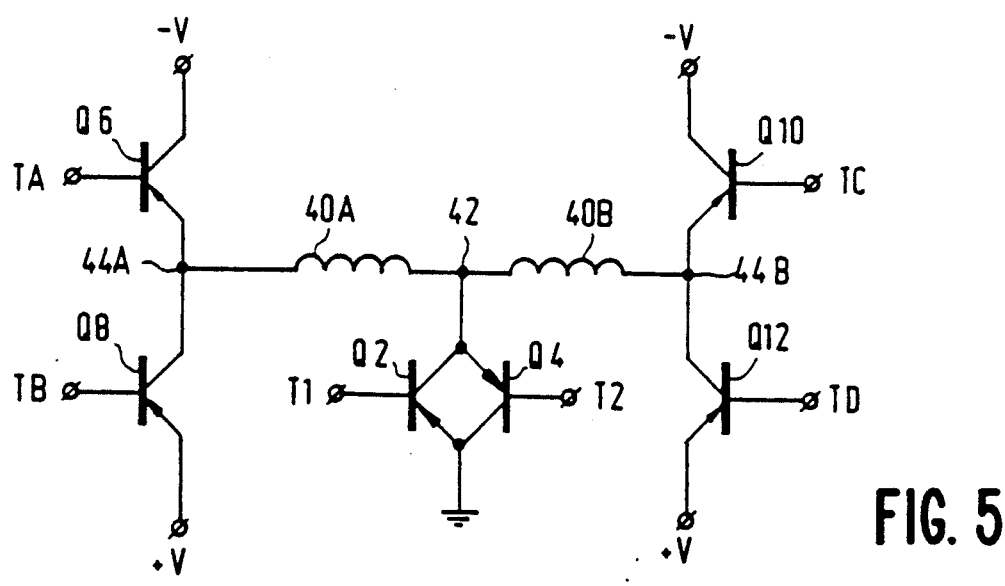
FIG. 5 is a schematic diagram of a driving means that may be connected to the loops of either FIGS. 3 or 4.

Referring to FIG. 5, previously illustrated write loops 40A and 40B are shown connected to a drive means. In particular, centertap 42 is shown connected to the collector and emitter of a semiconductive switching means, employing a pair of PNP transistors Q2 and Q4, respectively, whose emitter and collector, respectively are grounded. The bases of transistors Q2 and Q4 are identified herein as terminals T1 and T2, respectively. Terminals 44A and 44B are shown connected to a switchable supply. In this embodiment, PNP transistors Q6 and Q10 have their collectors connected to negative potential −V and their emitters connected to terminals 44A and 44B, respectively. PNP transistors Q8 and Q12 have their emitters connected to positive potential +V and their collectors connected to terminals 44A and 44B, respectively. The bases of transistors Q6, Q8, Q10 and Q12 are identified as terminals TA, TB, TC and TD, respectively.

If loops 40A and 40B are to conduct currents in different senses, the centertap 42 can be effectively connected to ground by turning either transistors Q2 or Q4 on by employing a relatively negative and zero potential to terminals to T1 and T2, respectively. Thus, if both loops 40A and 40B are to deliver current toward centertap 42, then transistors Q8 and Q12 are turned on by applying a relatively low potential on terminals TB and TD. On the other hand the current can be reversed by turning on transistors Q6 and Q10 by applying a relatively low potential to terminals TA and TC.

If the loops 40A and 40B are to deliver currents in the same sense, or operate in the low density mode, then centertap 42 will remain open by reverse biasing the base-emitter junctions of transistors Q2 and Q4, through terminals T1 and T2, respectively. The conductive states required of the various transistors to produce the indicated results, are listed in the following truth table:

| TRACK | Q2 | Q4 | Q6 | Q8 | Q10 | Q12 |
|---|---|---|---|---|---|---|
| +/+ | off | off | off | on | on | off |
| −/− | off | off | on | off | off | on |
| +/− | off | on | off | on | off | on |
| −/+ | on | off | on | off | on | off |

Instead of leaving the centertap 42 open, simple grounding is theoretically possible, but would frustrate equalization of the current in both loops. Unless the circuit paths were perfectly balanced, some net current would leak into or of out the reference level at the centertap, resulting in unequal coil currents.

The first two cases are applicable to the 36 track and the 18 track head. The other two cases are provided by transistors Q2, Q6 and Q10 turning on together or transistors Q4, Q8 and Q12 turning on together. In practice transistors Q2 and Q4 would preferably be pulsed with a longer pulse than the others.

Figure 6A:
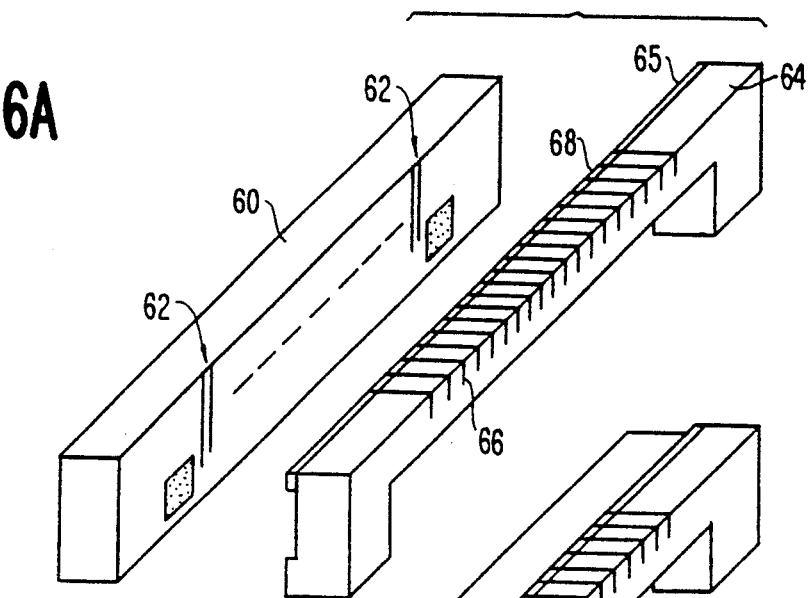
FIGS. 6A-D are assembly drawings showing the write head assembly of FIG. 1 in various stages of fabrication.

Referring to FIG. 6A, a ferrite base is shown as a rectangular element 60 onto which thin film coils, loops 62, are deposited in pairs, as previously described. A ferrite element 65 is used as a stator strip and is secured to the upper inside face of ferrite transverse bar 64. Bar 64 has an inverse "U" shape with relatively short legs. A series of nineteen longitudinal slots 66 are cut partially through the top of bar 64 thereby dividing stator strip 65 into a plurality of spaced stators 68. Each of the 18 stators 68 overlie 18 pairs of thin film loops 62.

The distance between the first and last cut 66 is somewhat less than one half inch. These cuts determine the space between write tracks and have the 0.9 mm dimension referred to previously. The head is designed for use on half inch tape.

Figure 6B:

As shown in FIG. 6B, bar 64 is affixed to base 60 by gluing or other mechanical means. The thickness of thin film loop 62 produce a gap over which magnetic flux lines can extend to magnetize a magnetic medium in the usual fashion.

Figure 6C:

In FIG. 6C, the assembly of FIG. 6B is relieved with eighteen recesses 70. In FIG. 6C the top of assembly 70 is lapped to expose stators 68 and set the exposed thickness of base 62, which thickness varies with the depth to which lapping occurs.

Figure 7A:
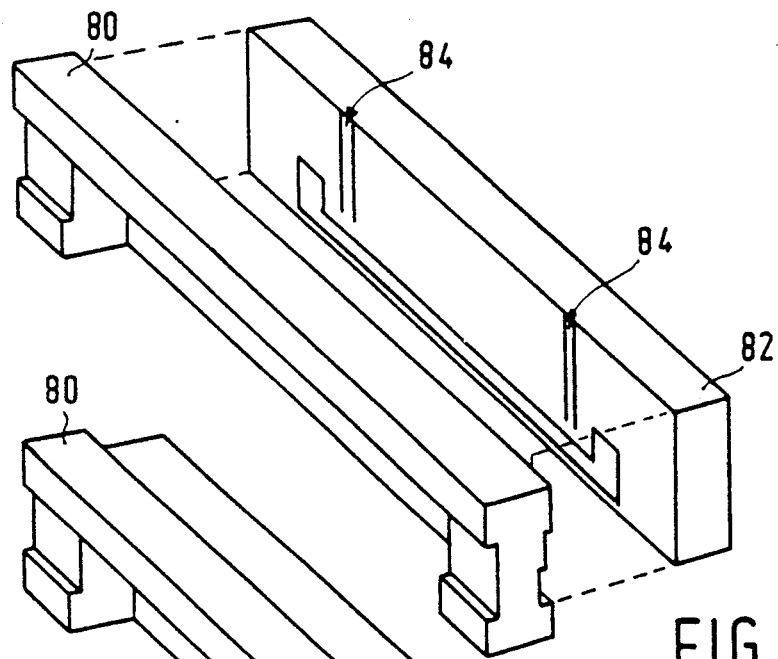
FIGS. 7A-D are an assembly drawings showing the read heads of FIG. 1 in various stages of fabrication.

Referring to FIG. 7A, a ferrite member 80 is shown with a squat, inverted "U" shape. A ferrite block 82 is shown having deposited on its inside face, an eighteen pairs of read loops 84. Loops 84 can be of the form shown in FIG. 3, although the loop to loop spacing can be adjusted in accordance with the spacing illustrated in FIG. 1.

Figure 7B:
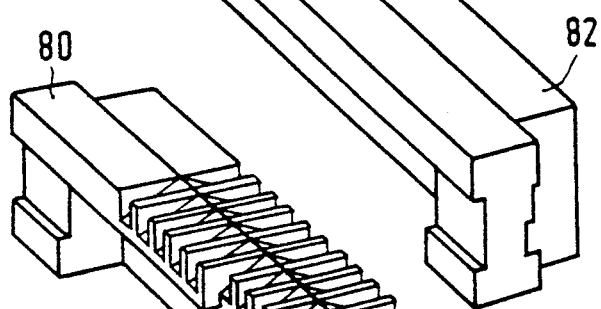
Figure 7C:
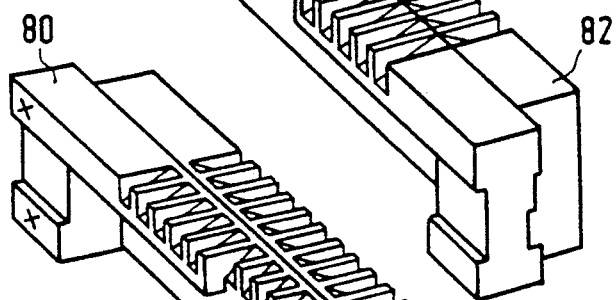
Figure 7D:
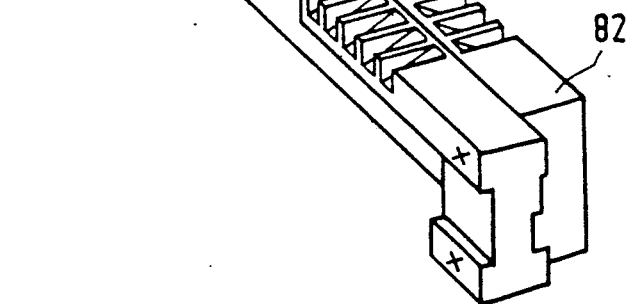

As shown in FIG. 7B, the elements 80 and 82 can be secured together, loops 84 establishing a gap for reading magnetic fields produced by a medium such as a moving tape, in the usual fashion. In FIGS. 7C and 7D, eighteen recesses are cut into both member 80 and block 82, although in some embodiments a different number can be used. For example 36 recesses can be cut for a 36 track embodiment. In addition, the upper surface is lapped to expose by a variable amount, the ferrite structure of member 80 and block 82.

Figure 6D:
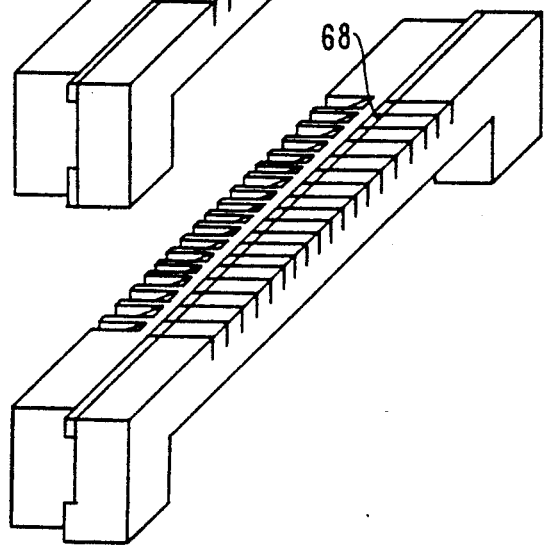

In a full assembly, the apparatus of FIG. 7D can be join to that of FIG. 6D to provide a combined read and write head.

To facilitate an understanding of the principles associated with the foregoing apparatus, its operation will now be briefly described. Assume that a one inch, eighteen track tap has been recorded with record head 10 (FIG. 1) at a pitch P. Under such circumstances, two read loops associated with poles 16 can be tied together in pairs so that their outputs add. Consequently, the output of a pair of read poles 16 will be approximately the same as the output from the older read pole 12, but degraded by the interpole space S1. This provides the backwards read compatibility.

For backwards write compatibility, the loops of write heads 14 are connected in series by the circuit shown in FIG. 5. Consequently, write pole 14 has about the same footprint as low density write head 10. Thus the system can write onto tape and closely simulate an eighteen track machine. Notice that because the write poles 14 are couplets having a unitary magnetic structure, there is practically no interference strip. Thus, if a tape previously recorded in an eighteen track format is rerecorded by magnetic heads 14, there will not be a magnetic residue in the center of the recorded track. Consequently, magnetic read head 12 can read the eighteen track data produced by heads 14 without degradation.

Accordingly, there is no break in the magnetic structure in the individual pairs of writing loops. The width of the unrecorded center section of the tracks is determined mainly by how closely the two coils are spaced rather than the cut in the magnetic structure. Also, the lack of a break in the ferrite enhances the natural fringing effects during recording, so the unrerecorded center section is made even narrower than might be inferred from the location of the coils.

When the system is operated in a 36 track mode, the pairs of write loops associated with head 14 (for example the loops of FIG. 3) are operated independently with the circuitry of FIG. 5. Since each head 14 has a pair of write loops, there can be an ambiguous central area between the loops 20A and 20B. This ambiguous region, however, does not enter into a zone where it would likely be read by magnetic read heads 16. On playback, magnetic read heads 16 are read independently so that 36 channels of information are available.

It is to be appreciated that various modifications may be implemented with respect to the above described embodiments. For example, the loops for the reading and writing poles can be formed in various ways including photoetching, discrete wire etc. Furthermore, the number of turns in the loops can vary depending upon the desired characteristics. Additionally, the number of tracks can be varied and need not be 36 or 18. Additionally, the various elements used to support the read and write loops can be formed out of other, but, preferably, ferromagnetic materials. Moreover, the read and write head is shown formed from four major ferrite components, although in some embodiments it can be composed from three or a different number of components. While a plurality of recesses are illustrated atop the read and write assemblies, in some embodiments they can be shaped differently; can be of a different number; or can be eliminated entirely, depending the desired contact area etc. Moreover, the read heads are shown with different spacing to each of its neighbors, but in other embodiments the spacing can be made even, although some degradation in read backwards compatibility may result. Additionally, the drive circuit for the write loops is shown constructed from six bipolar transistors, but in certain embodiments other switching devices such as FET's or other switching circuitry can be used instead. Furthermore, the dimensions and materials used can be altered depending upon the desired number of tracks, the density of recording, recording speed, frequency etc.

Obviously many modifications and variations of the present invention are possible in light of the above teachings. It is therefore to be understood that within the scope of the appended claims, the invention may be practiced otherwise than as specifically described.

What is claimed is:

1. A magnetic head assembly for reading from and writing to a plurality of tracks on a magnetic medium, said medium and assembly being relatively moveable in a longitudinal direction, comprising:
    a plurality of pairs of reading poles;
    a plurality of pairs of read loops each adjacent and magnetically coupled to an associated pair of said reading poles;
    a plurality of writing poles, each pair of said reading poles being aligned with a different corresponding one of said writing poles; and
    a plurality of pairs of write loops each pair of write loops being adjacent and magnetically coupled to an affiliated one of said writing poles, each pair of write loops being selectively driveable with a pair of currents in either the same or opposite sense.

2. A magnetic head assembly according to claim 1 wherein every one of said pairs of said reading poles is closer to one another than to any other one of said reading poles.

3. A magnetic head assembly according to claim 2 wherein each of said writing poles has a pair of transverse ends, each of said pairs of said reading poles being equidistant from the closer one of said transverse ends of said corresponding one of said writing poles.

4. A magnetic head assembly according to claim 3 further comprising:
    drive means coupled to said pairs of write loops for driving them in one of two states, the write loops in each of the pairs being driven either in opposition or sympathy, opposition being permitted in one of said states but not the other.

5. A magnetic head assembly according to claim 4 wherein each of said pairs of write loops comprises:
    a pair of circuits connected at a centertap.

6. A magnetic head assembly according to claim 4 wherein each of said pairs of write loops comprises two coplanar multi-turn coils.

7. A magnetic head assembly according to claim 6 wherein each of said pairs of write loops has a transverse dimension exceeding that of said affiliated one of said writing poles.

8. A magnetic head assembly according to claim 4 wherein said plurality of writing poles comprises:
    a transverse bar having a plurality of longitudinal slots; and
    a plurality of spaced stators affixed to said bar between different adjacent pairs of said slots.

9. A magnetic head assembly according to claim 8 wherein said plurality of pairs of write loops comprises:
    a base attached to said bar; and
    a plurality of pairs of conducting films deposited on said base and transversely positioned in pairs between different adjacent pairs of said slots, said conducting films being sandwiched between said base and said bar.

10. A magnetic head assembly according to claim 9 wherein said plurality of pairs of read loops comprises:
    a block;
    a plurality of equidistant conducting layers deposited on said block; and
    a member affixed to said block, said conducting layers being sandwiched between said member and said block.

11. A magnetic head assembly according to claim 10 wherein said member and said bar are affixed together.

12. A magnetic head assembly according to claim 11 wherein each of said pairs of write loops comprises:
    a pair of circuit connected at a centertap.

13. A magnetic head assembly according to claim 11 wherein each of said pairs of write loops comprises two coplanar multi-turn coils having a transverse dimension exceeding that of said affiliated one of said writing poles.

14. A magnetic head assembly according to claim 5 wherein said drive means comprises:

a semiconductive switching means connected to the centertap of said pair of circuits and operable to conduct current in two directions; and a pair of switchable supplies separately connected to said pair of circuits, each of said supplies being independently operable to bidirectionally supply current through said pair of circuits.

15. A method for assembling a magnetic head with reading and writing poles, and read and write loops, for reading and writing to a plurality of tracks on a magnetic medium, comprising the steps of:

magnetically and physically coupling pairs of said read loops to an associated pair of said reading poles;

magnetically and physically linking pairs of said write loops to an affiliated one of said writing poles;

aligning said pairs of said reading poles with a different corresponding one of said writing poles; and making connections to said pairs of write loops to allow them to be selectively driven with a pair of currents in either the same or opposite sense.

16. A method according to claim 15 employing conductive material, a base, a transverse bar and a stator strip, wherein the step of linking pairs of said write loops to said writing poles comprises the steps of:

securing the strip to said bar;
cutting slots into said bar and through said strip;
depositing said conductive material in pairs of conducting films on said base, said films being transversely positioned in pairs between different adjacent pairs of said slots; and attaching said base to said bar, said conducting films being sandwiched between said base and said bar.

17. A method according to claim 16 employing a member and a block, wherein the step of coupling pairs of said read loops to said reading poles comprises the steps of:

disposing said conductive material as a plurality of equidistant conducting layers on said block; and affixing said member to said block, said conducting layers being sandwiched between said member and said block.

18. A method according to claim 17 comprising the step of:

affixing together said member and said bar.

19. A method according to claim 15 comprising the steps of:

connecting each of said pairs of write loops into a pair of circuits connected at a centertap.

20. A method according to claim 15 wherein each of said pairs of write loops comprises two coplanar multi-turn coils having a transverse dimension exceeding that of said affiliated one of said writing poles.

* * * * *